(12) United States Patent  
Templeton

(10) Patent No.: US 8,540,157 B1
(45) Date of Patent: Sep. 24, 2013

(54) MAGNETIC READ HEAD WITH FLAT-EXTENDING PINS

(75) Inventor: Thomas Templeton, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 13/589,518

(22) Filed: Aug. 20, 2012

(51) Int. Cl.
*G06K 7/08* (2006.01)

(52) U.S. Cl.
USPC ............................................................ 235/449

(58) Field of Classification Search
USPC .......................................... 235/449; 360/137
See application file for complete search history.

(56) References Cited

U.S. PATENT DOCUMENTS

| | | | |
|---|---|---|---|
| 6,781,781 B2 * | 8/2004 | Wood | 360/67 |
| 7,740,173 B2 * | 6/2010 | Von Mueller et al. | 235/449 |
| 2002/0134837 A1 * | 9/2002 | Kishon | 235/449 |
| 2009/0173790 A1 * | 7/2009 | Hart et al. | 235/449 |

* cited by examiner

*Primary Examiner* — Daniel Hess
*Assistant Examiner* — Steven J Malone
(74) *Attorney, Agent, or Firm* — Fish & Richardson P.C.

(57) ABSTRACT

A magnetic read head includes a plurality of pins; circuitry for converting magnetic signals to electrical signals, where output of the circuitry is coupled to the plurality of pins; and a shield that encloses the circuitry, the shield having a front face through which magnetic signals pass to read the magnetic stripe, a base on a side of the shield opposite the front face, and one or more side surfaces between the base and the front face, and wherein the shield has an opening for each pin of the plurality of pins, wherein each pin is configured to pass through a respective opening, wherein the plurality of openings are positioned on the one or more side surfaces of the shield, where each pin extends from the shield along an axis that is parallel to a plane defined by the base of the shield.

12 Claims, 5 Drawing Sheets

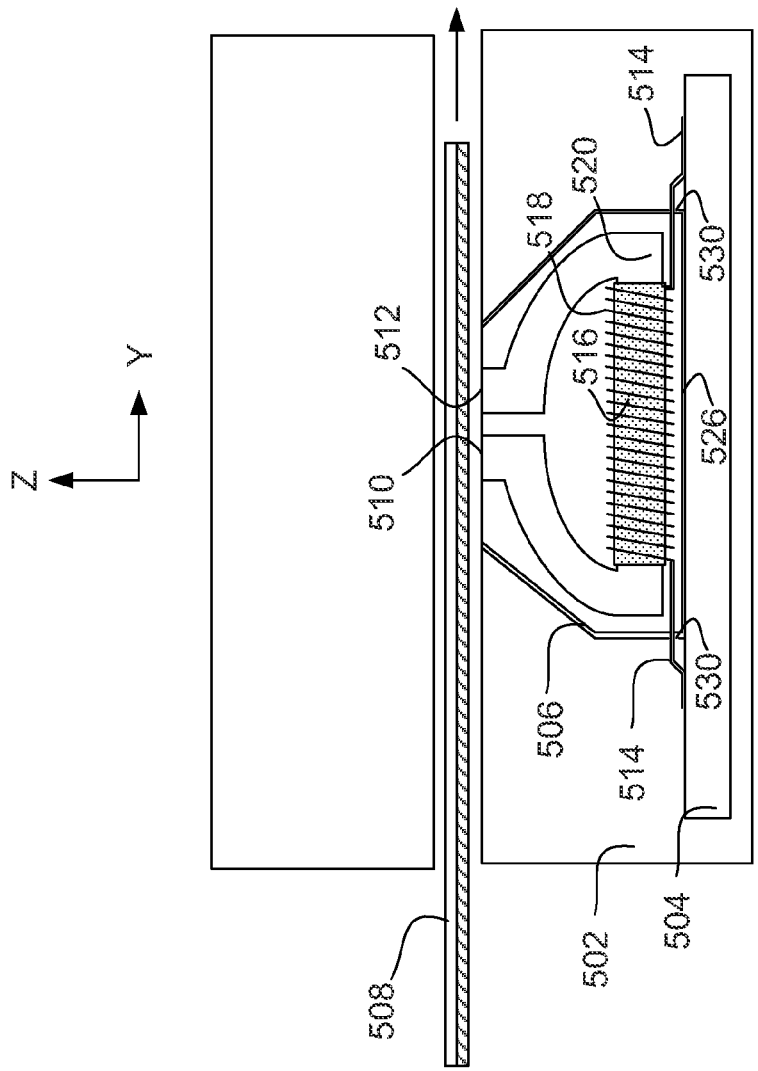
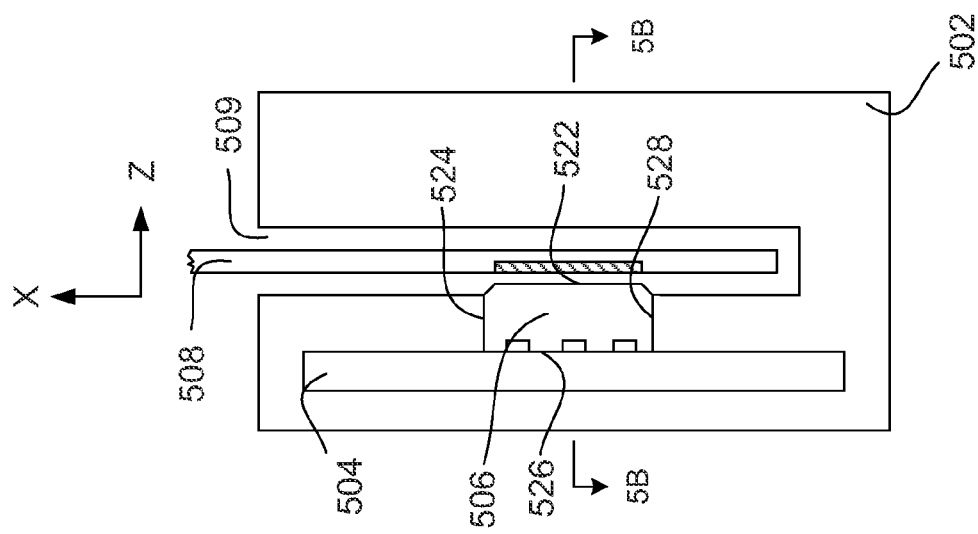
FIG. 5B
FIG. 5A

MAGNETIC READ HEAD WITH FLAT-EXTENDING PINS

TECHNICAL FIELD

This disclosure relates to a magnetic read head.

BACKGROUND

Magnetic read heads can be used to read magnetic media, e.g., the magnetic stripe on a magnetic stripe card. For example, the magnetic stripe on a magnetic stripe card generally has up to three tracks of data, each of which can be accessed by a magnetic read head. Magnetic read heads convert magnetic signals from the magnetic stripe to electrical signals. Magnetic read heads can include a core of material with high magnetic permeability, sometimes arranged in a U-shape, having a narrow gap between parallel ends of the core. The gap can be filled with a dielectric material. A coil can be wound around the core. When the magnetic read head scans the magnetic media, the magnetic read head converts fluctuations in the magnetic field caused by motion of the magnetic media into electrical signals. The electrical signals are transmitted to an electrical component, e.g., a printed circuit board.

Generally, a magnetic read head is connected to a printed circuit board using pins. The printed circuit board can have holes in the board for the pins to pass through. The pins project down "vertically", i.e., away from the magnetic media, from the magnetic read head. The pins are soldered on an underside of the printed circuit board.

SUMMARY

Card readers can be bulky because of their many components. Generally, the components have been designed to emphasize function as opposed to both function and size. For example, a typical point of sale system might include a housing that includes a combined touch display or keypad and a slot to swipe the card; miniaturization is not a particular concern in this environment. However, as card readers become more mobile, they may need to be thinner to increase overall convenience of use and card reader portability.

The thickness of a magnetic read head can be reduced by using "flat" pins. The magnetic read head can include circuitry for reading magnetic fields and a shield that encloses the circuitry. The shield can have openings on sides of the shield. This allows pins to extend from the openings "horizontally" parallel to the slot in the card reader. Thus, the horizontal pins can extend parallel to a primary surface of the magnetic stripe card. In addition, the pins can extend a plane parallel to a plane defined by a base of the shield.

In one aspect, a magnetic card reader for reading a magnetic stripe of a magnetic stripe card includes a plurality of pins; circuitry for converting magnetic signals to electrical signals, where output of the circuitry is coupled to the plurality of pins; and a shield that encloses the circuitry, the shield having a front face through which magnetic signals pass to read the magnetic stripe, a base on a side of the shield opposite the front face, and one or more side surfaces between the base and the front face, and wherein the shield has an opening for each pin of the plurality of pins, wherein each pin is configured to pass through a respective opening, wherein the plurality of openings are positioned on the one or more side surfaces of the shield, where each pin extends from the shield along an axis that is parallel to a plane defined by the base of the shield.

Implementations can include one or more of the following. Each pin is coupled to a printed circuit board, and where the printed circuit board is positioned parallel to the base.

Each opening is positioned a distance from the base of the shield, where the printed circuit board is positioned to be flush with the base of the shield, and where the printed circuit board fits under the extended plurality of pins. The printed circuit board has a socket for the magnetic read head to fit into. Each opening is positioned on the same side of the shield. Each opening includes insulation around a respective pin that passes through the opening. The coupling of each pin to the circuitry is configured to reduce noise, where the pin initially extends from the circuitry and curves up to 90 degrees through the respective opening.

In another aspect, a magnetic read head for reading a magnetic stripe of a magnetic stripe card includes a core having a first end and a second end that is generally flush with the first end, the first end and the second end configured to read the magnetic stripe of the magnetic stripe card as the magnetic stripe card is positioned in a plane adjacent to the first end and the second end; a coil wound around a portion of the core; a plurality of pins electrically connected to opposite ends of the coil; and a shield that encloses the core and the coil, wherein the shield has a front face that is generally flush with the first end and the second end of the core, a base on a side of the shield opposite the front face, and one or more side surfaces between the base and the front face, and at an opening in the one or more side surfaces for each pin of the plurality of pins, wherein each pin extends through a respective opening along an axis that is parallel to the plane.

In another aspect, a magnetic stripe card reader includes a housing having a slot shaped to receive a magnetic stripe card; a printed circuit board in the housing; a magnetic read head supported by the housing and positioned adjacent the slot to read a magnetic stripe of the magnetic stripe card when the magnetic strip card is swiped through the slot, the magnetic read head comprising a core having a first end and a second end, the first end and the second end configured to read the magnetic stripe of the magnetic stripe card as the magnetic stripe card is positioned in a plane adjacent the first end and the second end, a coil wound around a portion of the core, and a plurality of pins electrically connected to opposite ends of the coil, where each pin extends along an axis that is parallel to the slot and is electrically connected to the printed circuit board.

Advantages may include one or more of the following. Thickness of the magnetic read head can be reduced because the pins extend in a flat direction, e.g., extend in a direction in the XY plane rather than along a Z-axis. Manufacturing of magnetic read heads with pins extending in the flat direction is improved by attaching the pins to a printed circuit board using Surface Mount Technology (SMT). In particular, being able to use SMT improves throughout, decreases cast, and increases XY placement accuracy. The magnetic read head can have openings that insulate the flat pins from noise. If the pins extend in a flat direction and are positioned a height from the base of the shield, a printed circuit board can be flush with the base of the shield, thereby fitting under the pins and saving more space. Pins can be positioned on one side of the shield, which can make space for a system that requires more than one magnetic read head, e.g., a magnetic card reader with two magnetic read heads, which can allow card swipes from two directions.

BRIEF DESCRIPTION OF THE DRAWINGS

FIG. 5A is a side view of an example magnetic read head in a magnetic stripe reader with a magnetic stripe card being swiped.

FIG. 5B is a top view of the example magnetic stripe reader.

Like reference numbers and designations in the various drawings indicate like elements.

DETAILED DESCRIPTION

Figure 1B:
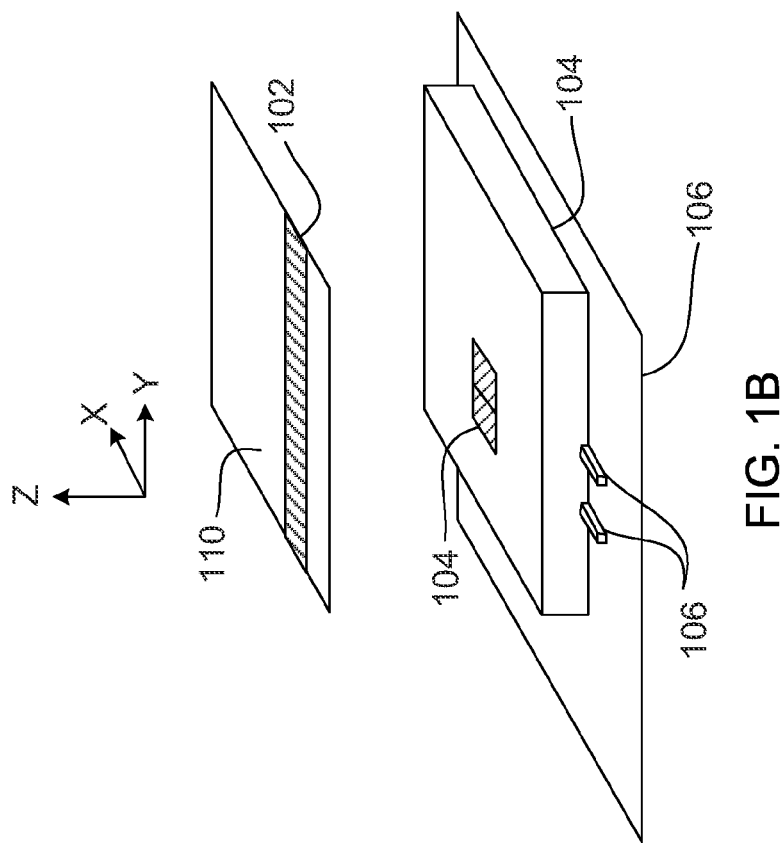
FIG. 1B is a schematic perspective view of an example architecture for a system using a magnetic read head.
Figure 1A:
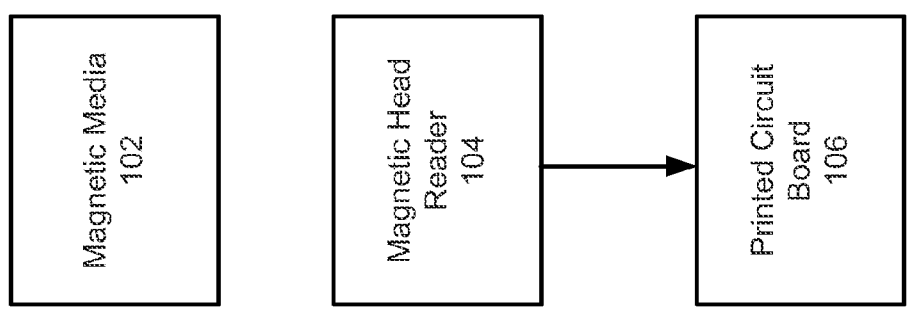
FIG. 1A is a block diagram of an example architecture for a system using a magnetic read head.

FIG. 1A is a block diagram of an example architecture for a system using a magnetic read head 104. The system can include magnetic media 102, the magnetic read head 104, and a printed circuit board 106. The magnetic read head 104 reads magnetic signals from the magnetic media 102, e.g., a magnetic stripe of a magnetic stripe card, and converts the magnetic signals to electrical signals. The magnetic read head 104 can have pins that are coupled to the printed circuit board 106, e.g., using surface mount technology (SMT). The magnetic read head 104 can send the electrical signals to the printed circuit board 106. Circuitry on the printed circuit board 106, e.g., an application specific integrated circuit (ASIC) or a programmed microprocessor, can process the electrical signals and perform operations based on the signals. For example, the circuitry on the printed circuit board 106 can determine a digital output, such as alphanumeric values stored on the magnetic stripe, e.g., a credit card number, from the electrical signals.

FIG. 1B is a schematic illustration of an example architecture for a system using a magnetic read head 104 in a magnetic strip card reader. A magnetic stripe card 110 is held by a frame (e.g., see slot 509 in FIGS. 5A and 5B) of the card reader. A primary face of the card 110 when it is oriented by the frame defines an XY plane. The magnetic stripe 102 on the card 110 extends along a direction that defines a Y-axis. The direction perpendicular to the XY plane defines a Z-axis.

The magnetic read head 104 is positioned adjacent the magnetic stripe 102 of the card 110; the magnetic read head 104 has a depth along the Z-axis extending away from the card 110. Although the read head 104 is shown as spaced apart along the Z-axis from the card 110 in FIG. 1B, in practice the card 110 can contact the read head 104. Pins 206 that extend from the read head 104 electrically connect the read head 104 to circuitry on the printed circuit board 106.

Figure 2B:
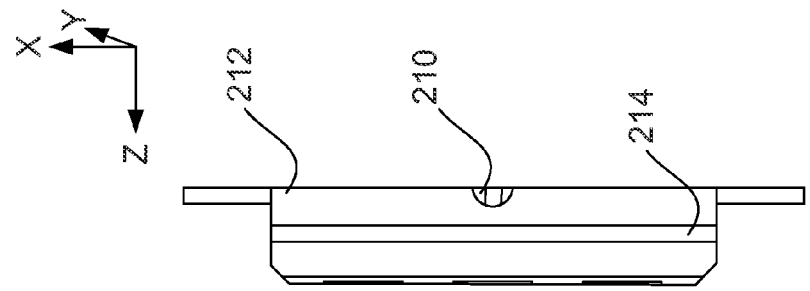
FIG. 2B is a side view of the example magnetic read head.
Figure 2A:
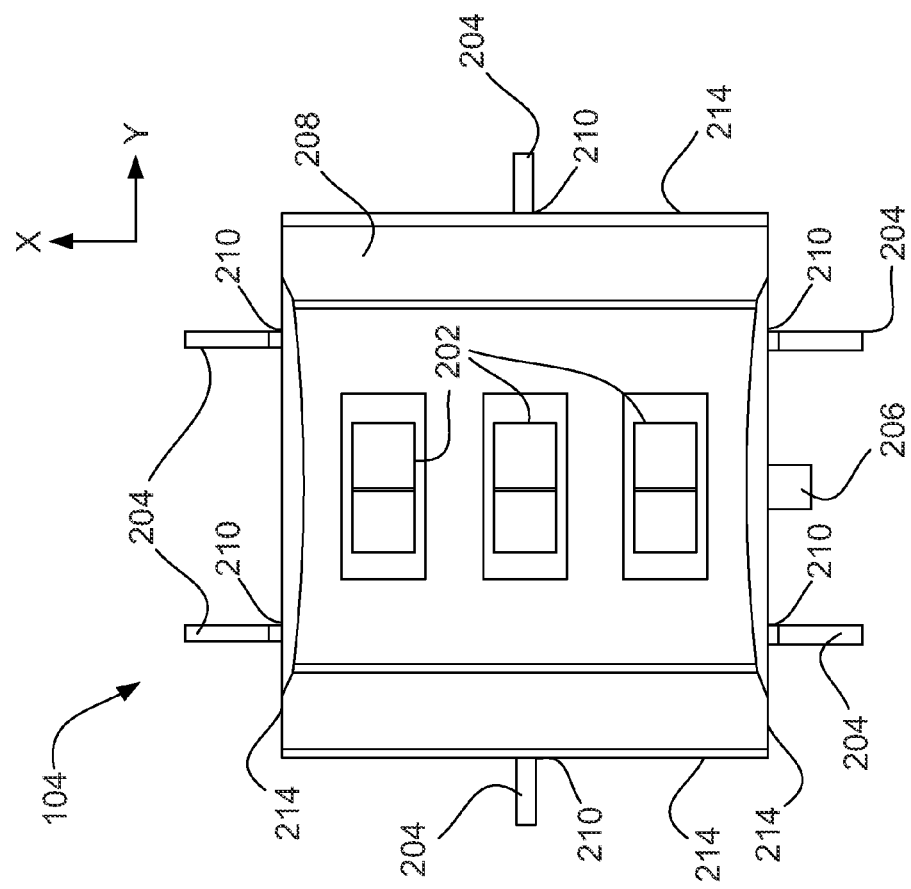
FIG. 2A is a top view of an example magnetic read head.

FIG. 2A is a top view of a magnetic read head 104, and FIG. 2B is a side view of the magnetic read head 104. The magnetic read head 104 can be a 3-track read head with three track readers 202. In some implementations, the magnetic read head is a 1-track or 2-track read head. Where the magnetic read head 104 includes multiple tracks, the tracks can be spaced apart along the X-axis in order to read the separate tracks on the magnetic stripe of the card.

The magnetic read head 104 includes a shield 208 that surrounds internal circuitry. The internal circuitry can be configured to convert magnetic signals from magnetic media to electrical signals. Output of the internal circuitry can be coupled to pins 204 of the magnetic read head. For example, each track reader can be coupled to two pins. The shield 208 can have a grounding pin 206 for connection to electrical ground to ground the shield. Each of the pins 204 can be coupled to a printed circuit board. The pins 204 can receive the output of the internal circuitry, e.g., the electrical signals based on the magnetic media, which is passed to the printed circuit board for processing, e.g., converting the analog electrical signals to digital signals. The grounding pin 206 can be connected to an electrical ground trace on the printed circuit board.

The pins 204 can extend from openings 210 in the shield 208. The openings 210 can be positioned on one or more sides 214 of the shield 208. In some implementations, the openings 210 are positioned immediately adjacent a base 212 of the shield. The pins 204 can extend from the shield along an axis that is parallel to a plane defined by the base 212 of the shield. In some implementations, the pins 204 lie on an XY plane as they emerge from the shield. In some alternative implementations, after emerging from the shield on the XY plane, the pins 204 extend obliquely from or perpendicular to the XY plane. Generally, pins extend from the base along an axis perpendicular to the plane defined by the base 212 of the shield. By having pins extend in a "flat" direction, e.g., in a direction in the XY plane instead of the Z-direction, the height, also referred to as a thickness, of the magnetic read head is reduced.

Figure 3A:
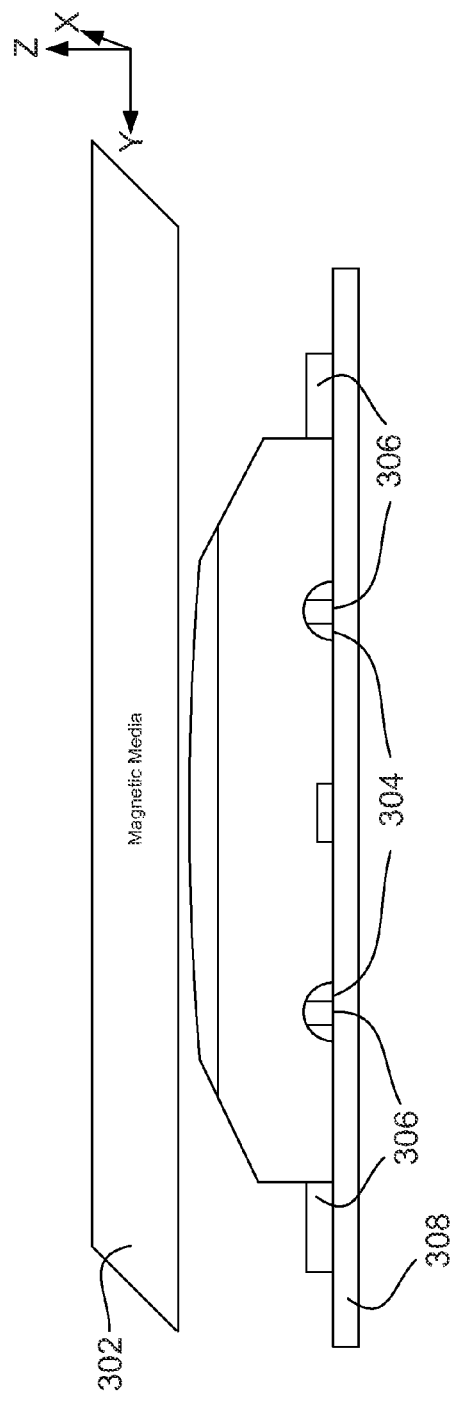
FIG. 3A is a side view of the example magnetic read head with pins that are lying "flat."

FIG. 3A is a side view of the magnetic read head with pins that are lying "flat." The magnetic read head can read magnetic media 302 that is positioned above the shield. Pins 306 of the magnetic read head can extend from the openings 304. For example, the magnetic read head can be in a card reader, and the magnetic media 302 can be a magnetic stripe card, e.g., a credit card. When swiping the card in the card reader, the magnetic read head can read information stored on the magnetic stripe. The magnetic read head can lie on a printed circuit board 308, and pins 306 can be coupled to the printed circuit board 308, e.g., using surface mount technology for soldering.

Figure 3B:
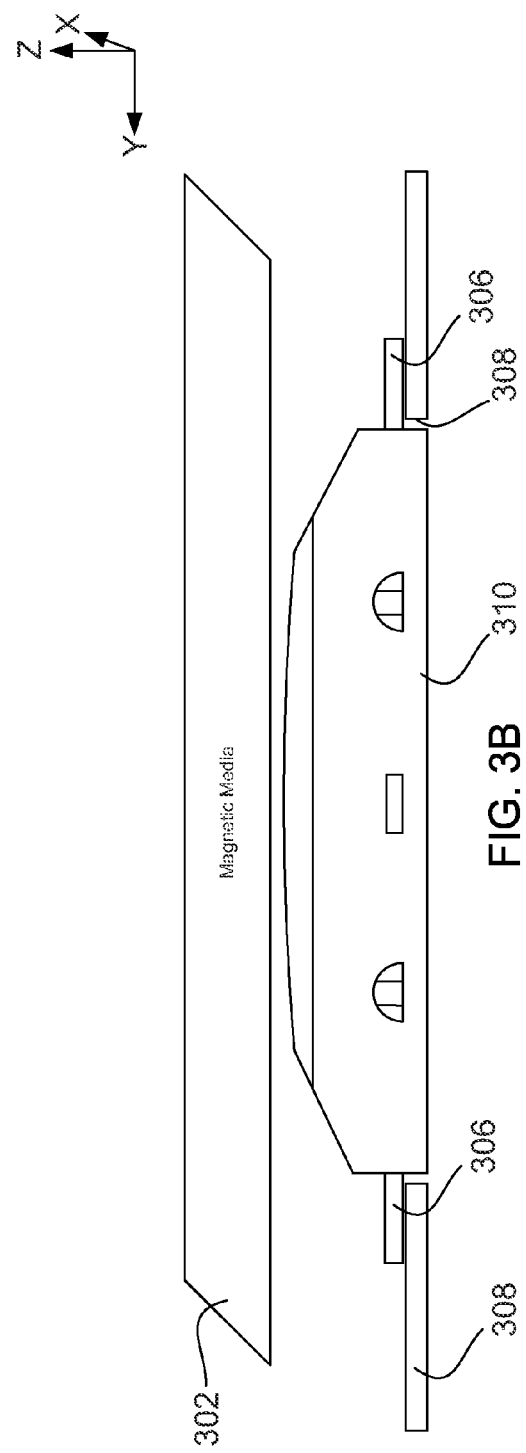
FIG. 3B is a side view of the example magnetic read head coupled with pins slightly elevated from a base of a shield.

FIG. 3B is a side view of the magnetic read head coupled with pins slightly elevated from a base 310 of a shield. Pins 306 of the magnetic read head, and therefore openings 304 in the shield, can be positioned a height above the base 310 of the shield. For example, the height value can be equivalent to, or slightly higher than, a thickness of the printed circuit board 308. By positioning the pins 306 above the base 310 of the shield, the printed circuit board 310 can be positioned to be flush with the base 310 of the shield, thereby being aligned on a same plane as the base 310. In some implementations, the printed circuit board 308 includes an aperture 320 that provides a socket for the bottom of the magnetic read head to fit into. Pins of the magnetic read head can be soldered to the printed circuit board 308. By placing the magnetic read head into the socket, the overall height of a system including both the magnetic read head and the printed circuit board 310 can be reduced.

Figure 4:
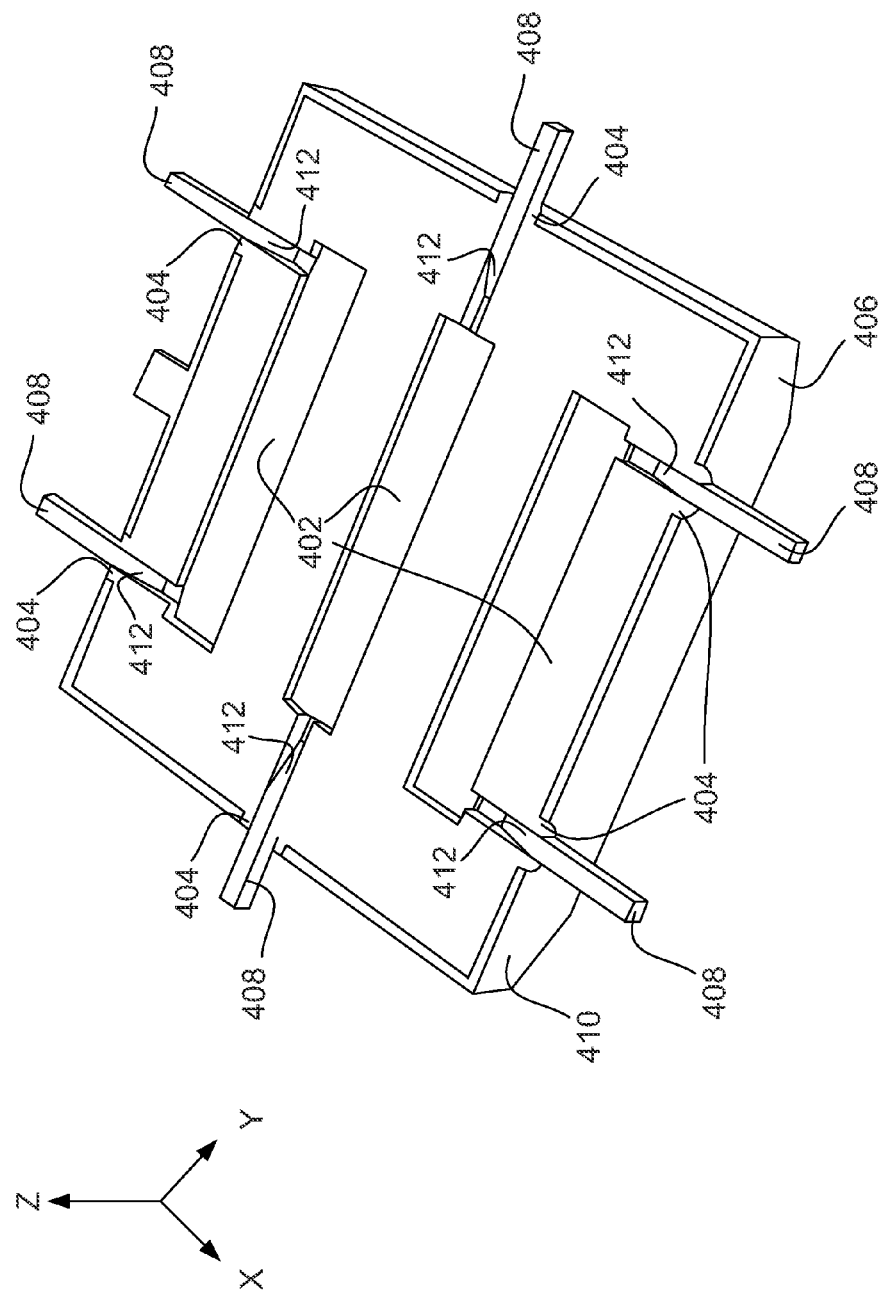
FIG. 4 is a perspective view of the example magnetic read head turned upside down.

FIG. 4 is a perspective view of the magnetic read head turned upside down. The magnetic read head can have 3 tracks 402. Each track can be coupled to pins 408 that extend laterally, e.g., in a "flat" direction. Each track can be in a slightly recessed region of the shield 406. The pins 408 can pass through openings 404 in the shield 406. The openings 404 can include insulation, e.g., a resin, around the pins 408 to reduce noise. In some implementations, each of the pins 408 extends from the tracks 402 and can curve up to 90 degrees before passing through a respective opening. The curvature 412 of the pin can reduce electrical noise.

In some implementations, openings 404 are positioned on only one side 410 of the shield. The other sides of the shield do not have openings for pins. In this way, each of the pins 408 can extend in the same direction, e.g., extend from one side of the shield. This can allow two magnetic read heads to be positioned, e.g., in a card reader, so that the pins will not overlap with each other.

FIG. 5A is a side view of a magnetic read head in a magnetic stripe reader with a magnetic stripe card being swiped, and FIG. 5B is a top view of the magnetic stripe reader. The magnetic stripe reader can include a housing 502 that encapsulates a magnetic read head attached to a printed circuit board 504. A magnetic stripe card 508 can be swiped in a direction parallel to the Y-axis through a slot 509 of the magnetic stripe reader 502.

The magnetic stripe of the magnetic stripe card 508 can be scanned by a magnetic read head 104. The magnetic read head includes a shield 506, a core 520, and pins 514 extending from the shield. The core 520 can have a first end 510 and a second end 512 which are configured to read the magnetic stripe. In particular, the first end 510 and the second end 512 are smooth surfaces that can be substantially coplanar and spaced apart by a very small gap. Although illustrated in FIG. 5A as a planar surface, the ends 510, 512 can have a slight curvature.

The core can have coil 518 wrapped around a bobbin 516 that surrounds a portion of the core 520. In some implementations, the bobbin 516 is manufactured from materials that are able to withstand high temperatures. This allows SMT to be used on the entire magnetic read head. The coil 518 can be coupled to the pins 514 extending from the shield 506 of the magnetic read head.

The shield 506 encloses the core 520 and the coil 518. The shield 506 can have a front face 522 through which magnetic signals pass. In particular, the core 520 can project into openings in the front face 522. The ends 510, 512 of the core 520 can be substantially flush with the front face 522. Although the front face 522 is illustrated in FIG. 5A as a planar surface, the front face 522 can be slightly convex. The gap between the ends 510, 512 can be located at the outermost point of the convex surface. The plane tangent to the front face 522 at the outermost point of the convex surface can be parallel to the XY plane.

A base 526 can be on a side of the shield opposite the front face 522. The shield 506 can have one or more side surfaces 524, 528 between the base 526 and the front face 522. The shield 506 can have one or more openings 530 for pins 514 to extend along an axis that is parallel to a plane defined by the base 526 of the shield 506.

The magnetic stripe of the magnetic stripe card 508 can be positioned in a XY plane adjacent to the first end 510 and the second end 512. As the magnetic stripe card 509 is swiped near the core 520, the magnetic signals from the card 509, which can represent a card number, pass through the core 520 and generate one or more currents in the coil 518. Changes in the currents can be digitized, e.g., by an analog to digital convertor on the printed circuit board 504, into digital signals for processing.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A magnetic read head for reading a magnetic stripe of a magnetic stripe card, comprising:
   a plurality of pins;
   circuitry for converting magnetic signals to electrical signals, where output of the circuitry is coupled to the plurality of pins; and
   a shield that encloses the circuitry, the shield having a front face through which magnetic signals pass to read the magnetic stripe, a base on a side of the shield opposite the front face, and one or more side surfaces between the base and the front face, and wherein the shield has a respective opening for each pin of the plurality of pins to provide a plurality of openings, wherein each respective opening in the shield extends through a side surface from the one or more side surfaces of the shield, wherein each pin passes from inside of the shield, through the respective opening in the side surface of the shield, and to outside of the shield, wherein each pin extends from the shield along an axis that is parallel to a plane defined by the base of the shield, where each pin is straight, and where a bottom surface of each pin is coplanar with a bottom surface of the base of the shield.

2. The magnetic read head of claim 1, where each pin is coupled to a printed circuit board, and where the printed circuit board is positioned parallel to the base.

3. The magnetic read head of claim 2, where each opening is positioned a distance from the base of the shield, where the printed circuit board is positioned to be flush with the base of the shield, and where the printed circuit board fits under the extended plurality of pins.

4. The magnetic read head of claim 3, where the printed circuit board has a socket for the magnetic read head to fit into.

5. The magnetic read head of claim 1, where each opening is positioned on the same side of the shield.

6. The magnetic read head of claim 1, where each opening includes insulation around a respective pin that passes through the opening.

7. The magnetic read head of claim 1, where the coupling of each pin to the circuitry is configured to reduce noise, where the pin initially extends from the circuitry and curves up to 90 degrees through the respective opening.

8. A magnetic read head for reading a magnetic stripe of a magnetic stripe card, comprising:
   a core having a first end and a second end that is generally flush with the first end, the first end and the second end configured to read the magnetic stripe of the magnetic stripe card as the magnetic stripe card is positioned in a plane adjacent to the first end and the second end;
   a coil wound around a portion of the core;
   a plurality of pins electrically connected to opposite ends of the coil; and a shield that encloses the core and the coil, wherein the shield has a front face that is generally flush with the first end and the second end of the core, a base on a side of the shield opposite the front face, and one or more side surfaces between the base and the front face, wherein the shield has a respective opening for each pin of the plurality of pins to provide a plurality of openings, wherein each respective opening in the shield extends through a side surface from the one or more side surfaces of the shield, wherein each pin extends from inside of the shield, through the respective opening in the side surface of the shield, and to outside of the shield along an axis that is parallel to the plane, where each pin is straight, and where a bottom surface of each pin is co-planar with a bottom surface of the base of the shield.

9. A magnetic stripe card reader, comprising:
a housing having a slot shaped to receive a magnetic stripe card;
a printed circuit board in the housing;
a magnetic read head supported by the housing and positioned adjacent the slot to read a magnetic stripe of the magnetic stripe card when the magnetic strip card is swiped through the slot, the magnetic read head comprising
  a core having a first end and a second end, the first end and the second end configured to read the magnetic stripe of the magnetic stripe card as the magnetic stripe card is positioned in a plane adjacent the first end and the second end,
  a coil wound around a portion of the core,
  a shield with a plurality of openings; and
  a plurality of pins electrically connected to opposite ends of the coil, where each pin extends from inside of the shield, through a respective opening in a side surface of the shield, and to outside of the shield along an axis that is parallel to the slot and is electrically connected to the printed circuit board, where each pin is straight, and where a bottom surface of each pin is co-planar with a bottom surface of a base of the shield.

10. A method for manufacturing a magnetic stripe card reader, comprising:
  providing a printed circuit board including a plurality of solder pads;
  providing at least one magnetic read head including a plurality of pins;
  placing the at least one magnetic read head on the printed circuit board such that the plurality of pins are adjacent the plurality of solder pads, where each pin extends from inside of a shield, through a respective opening in a side surface of the shield, and to outside of the shield along an axis that is parallel to a plane defined by the printed circuit board, where each pin is straight, and where a bottom surface of each pin is co-planar with a bottom surface of a base of the shield;
  applying solder to the plurality of pins and the solder pads on the printed circuit board; and
  heating the printed circuit board with the plurality of magnetic read heads to bond the plurality of pins to the printed circuit board.

11. The method of claim 10, wherein the at least one magnetic read head includes:
  a core having a first end and a second end, the first end and the second end configured to read the magnetic stripe of the magnetic stripe card as the magnetic stripe card is positioned in a plane adjacent the first end and the second end,
  a coil wound around a portion of the core, and
  a plurality of pins electrically connected to opposite ends of the coil, where each pin is electrically connected to the printed circuit board.

12. The method of claim 10, further comprising:
  providing a housing having a slot shaped to receive a magnetic stripe card; and
  placing the at least one magnetic read head and the printed circuit board in the housing, where the at least one magnetic read head is positioned adjacent the slot to read a magnetic stripe of the magnetic stripe card when the magnetic strip card is swiped through the slot.

* * * * *